United States Patent [19]

McClure et al.

[11] 4,176,547

[45] Dec. 4, 1979

[54] TORQUE CORRELATION RING

[75] Inventors: John W. McClure, Milford; George S. Hudson, Hamden, both of Conn.

[73] Assignee: Avco Corporation, Stratford, Conn.

[21] Appl. No.: 850,990

[22] Filed: Nov. 14, 1977

[51] Int. Cl.² .................................................. G01L 3/02
[52] U.S. Cl. .................................................. 73/136 R
[58] Field of Search ...................................... 73/136 R

[56] References Cited

U.S. PATENT DOCUMENTS

| 2,385,005 | 9/1945 | Langer | 73/136 R |
| 2,845,795 | 8/1958 | Emmerling | 73/136 R |
| 3,595,074 | 7/1971 | Johnson | 73/136 R |

*Primary Examiner*—Charles A. Ruehl
*Attorney, Agent, or Firm*—Irwin P. Garfinkle; Robert J. McNair, Jr.; Ralph D. Gelling

[57] ABSTRACT

A torque correlation ring is disclosed which forms a part of a test stand useful in measuring performance of aircraft turboshaft engines. The torque ring assembly comprises two annular rings separated from each other by four short equally spaced beams. One of the annular rings is fixedly attached to the frame of the test stand. The engine casing is attached to the second ring. Attachment is such that the engine is axially suspended within the annular rings with the propeller shaft on one side and the turbine exhaust on the other. Torque reaction forces on the engine casing stemming from supplying power to a propeller will be passed from the second annular ring to the frame mounted, first annular ring via the four beams. The magnitude of this torque is measured by means of strain gages mounted on each of the four beams. The electrically combined signal from the strain gages represent an accurate measurement of the torque forces being supplied to the propeller by the engine under test.

9 Claims, 8 Drawing Figures

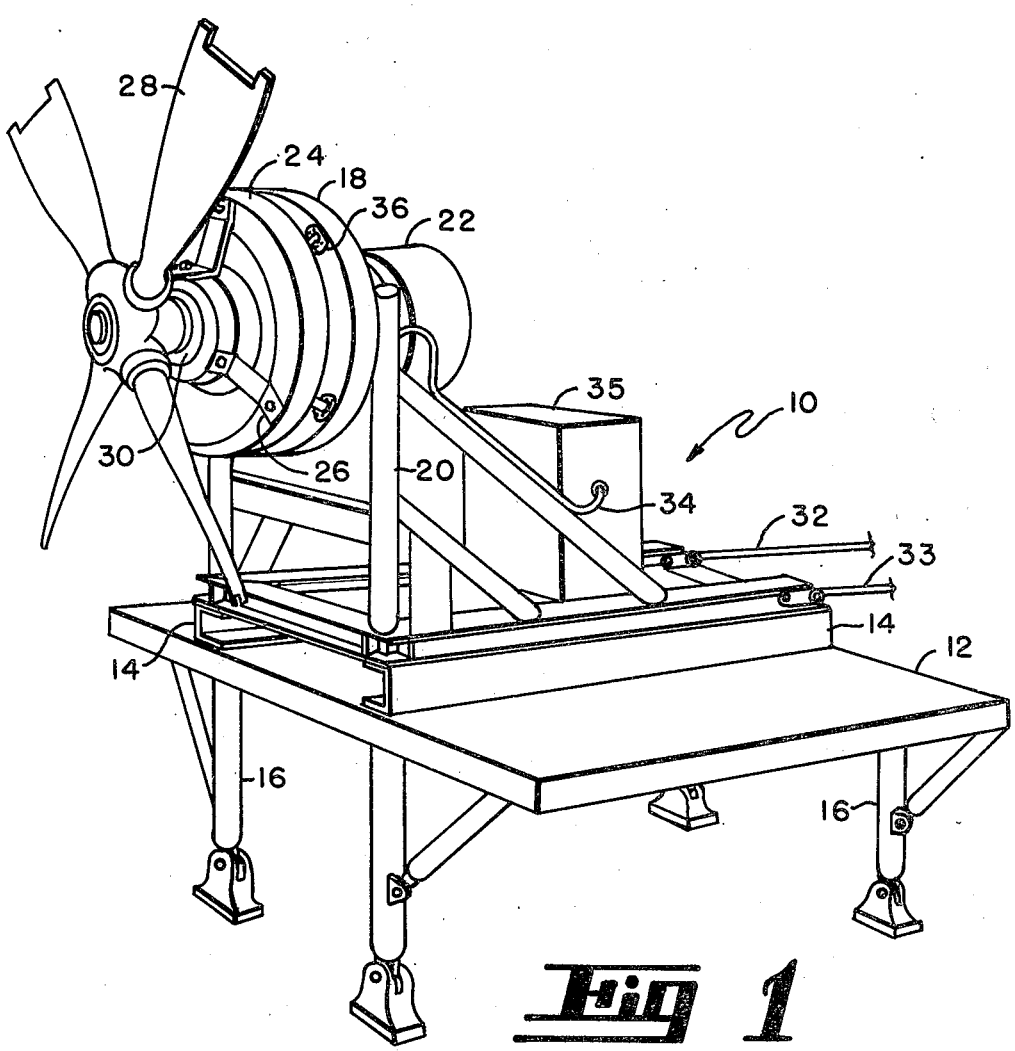
Fig 1
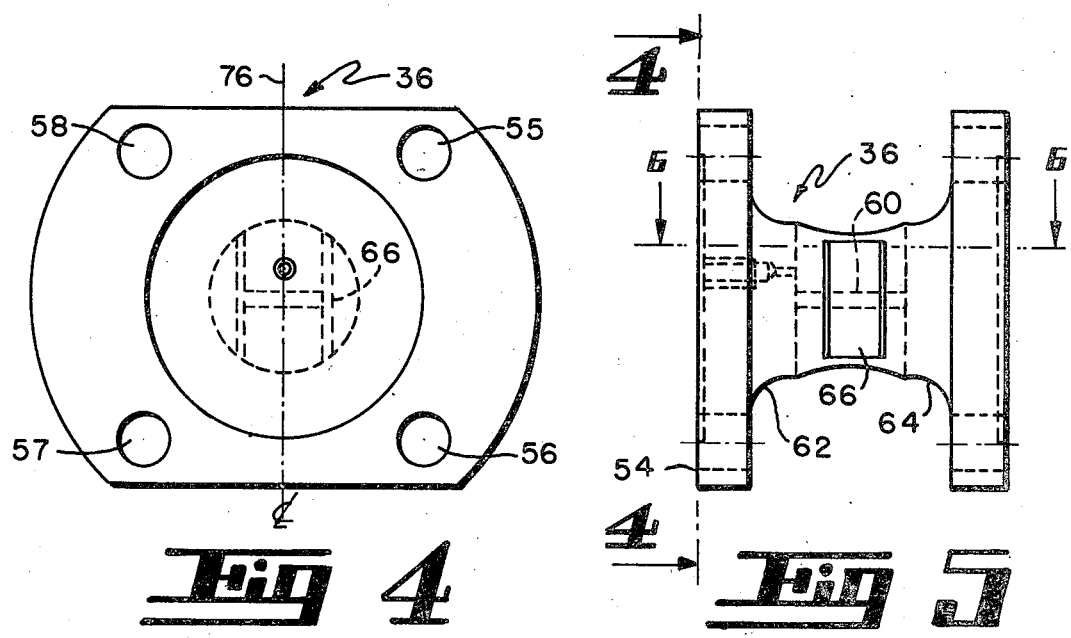
Fig 4
Fig 5

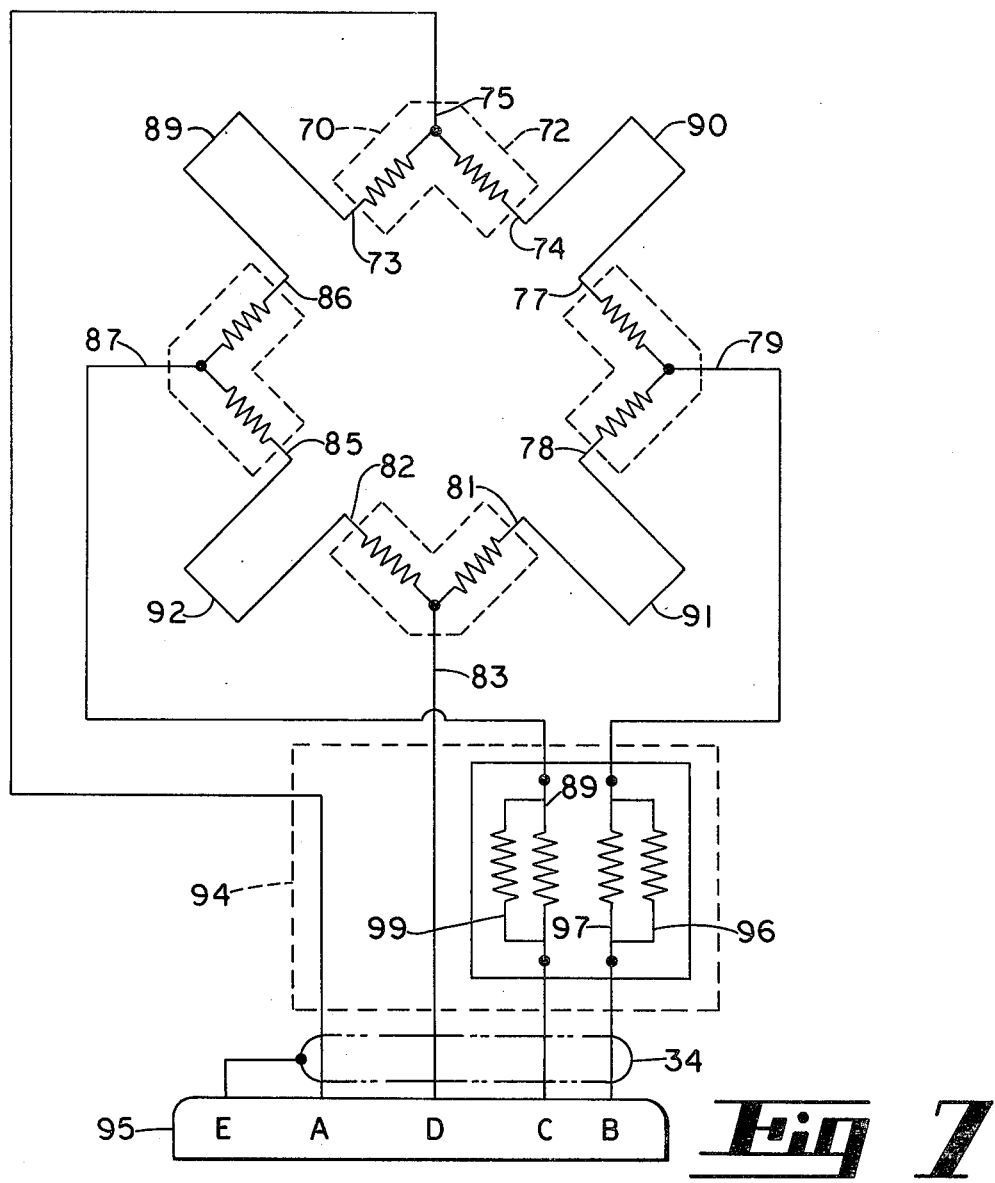
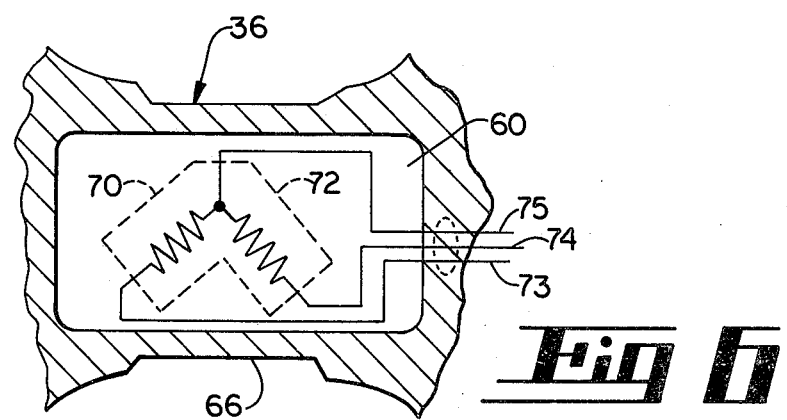

TORQUE CORRELATION RING

BACKGROUND OF THE INVENTION

The testing and evaluation of turboprop engines requires accurate measurement of the output shaft torque. The power output of an engine in horsepower=$2\pi nT/33,000$ where n=rpm of the output shaft and T=torque in ft.-lb. Mechanical power measuring devices include dynamometers which absorb energy and dissipate it as heat. This class of dynamometers often utilizes electrical generators, water brakes, compressors or fan brakes as the power absorber. The fan brake type of power absorber can be made to match the speed and torque requirements of a turboprop engine. The fan brake usually takes the form of a test club or actual flight propeller. The reason for this selection is that the power absorption device must be large in order to accommodate the relatively low speed and high torque present at the output shaft of a turboprop engine.

There is then the problem of making an accurate and repeatable measurement of the power being supplied to the fan brake by the output shaft of the engine. Measurement of torque must be both reliable and correlatable with a traceable standard as specified by the U.S. Bureau of Standards.

Our invention provides a practical and reliable solution to this torque measuring problem. Our invention accomplishes this by measuring the torque reaction forces on the engine casing. Power supplied to the propeller creates an equal and opposite reaction torque on the engine casing. The torque correlation ring serves as the engine mounting which couples the engine to the test stand. This invention makes it possible to measure output shaft torque by measuring reaction torque sensed through the engine mounting points. Torque data coupled with shaft revolutions per minute then provides a measure of output power. Note, in effect bearings are eliminated and the strain gaged beams act as flexure supports.

SUMMARY OF THE INVENTION

This invention concerns the torque measuring portion of a power absorption dynamometer used in testing engines having a shaft type output. The torque measuring assembly includes two vertically oriented annular rings of large diameter. The rings are separated from each other by four equally spaced strain gaged beams, each beam being mounted with its axis parallel to the test stand deck. One of the annular rings is fixedly attached to the frame of the test stand. The turboshaft engine is attached to the second ring so that it is suspended within the space enclosed by the annular rings. Attachment of the engine to the second ring is accomplished by means of special jigs. Each jig is configured to match the mounting holes on the casing of a given engine. In this way the test stand can be used in measuring performance data on a number of different engines. Fuel and control lines are attached to the engine on the test stand. A properly sized fan is fitted to the output shaft of the engine.

Then as the engine is operated and power furnished to the fan, reaction torque will be experienced at the engine casing mounting points. This reaction torque will pass through the jig fixture and into the second annular ring. Torque forces will be resisted by the four strain gaged beams which separate the second annular ring from the first.

Each strain gaged beam contains a pair of strain gages mounted on a central surface. The four beams with two strain gages each are wired together to form an electronic bridge assembly. The electrically combined signal from the four beams is compensated to provide an accurate measurement of torque irrespective of ambient temperature. The electrically combined signal can be read out on standard strain gage equipment.

The center section of each beam is specially configured so that when the strain gages are mounted thereon, the torque correlation ring assembly is responsive to torque applied in the radial plane yet is highly insensitive to torque moments along the axial direction or to weight applied in the vertical direction.

BRIEF DESCRIPTION OF THE DRAWINGS

Having generally described the nature of the invention and the manner in which it functions, reference is made to the accompanying drawings, in which:

FIG. 1 shows an isometric view of the engine test stand with which the invention is of particular utility.

FIG. 4 is an end view of one of the strain gaged beams showing the flange which attaches to the annular ring.

FIG. 5 is a side view of the central beam showing the flat surface at the side thereof which is in front of the hollowed out midsection.

FIG. 6 is an enlarged view of the center portion of the strain gage beam taken along line 6—6 of FIG. 5 showing the positioning of the strain gages on the flat surface of the beam.

FIG. 7 is a schematic of the bridge circuit arrangement of the four sets of strain gages.

DESCRIPTION OF THE PREFERRED EMBODIMENT

Figure 2:
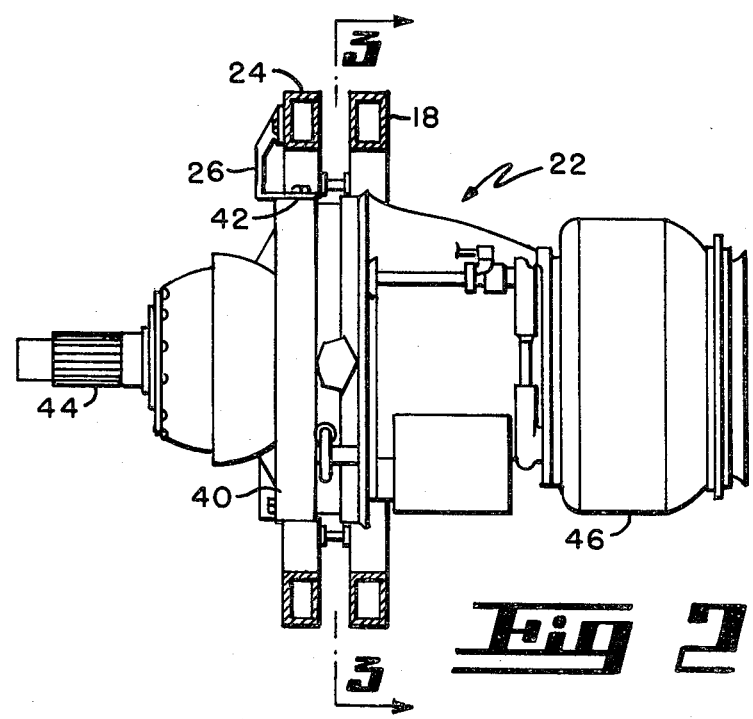
FIG. 2 is a side view of a turboshaft engine mounted within the torque correlation ring.

In FIG. 1 there is shown an isometric view of the engine test stand 10 which utilizes the torque correlation ring. The test stand may be made mobile by mounting the entire assembly on a flat bed truck. The truck (not shown) would have a rear deck 12 across which framing members 14 could be secured as by bolts to support the test stand assembly. For the truck mounted configuration, hydraulically extendable legs 16 serve to level up the test bed, take the load off the flexible suspension mechanism of the truck and form a solid support for the engine tests to be conducted.

The first ring 18 of the torque correlation ring assembly is secured as by bolts to the frame 20 of the test stand. The engine 22 is supported on the second ring 24 of the torque correlation ring assembly by means of mounting jig 26. Test propeller 28 mounts on the output shaft 30 of engine 22. It will be noted that propeller 28 used on the system reduced to practice was of the test club variety having short, broad propeller blades. Cables 32 and 33 were attached at one end to the frame ends of the test stand and at the other end are secured to anchor blocks (not shown). Cables 32 and 33 counteract the axial thrust of propeller 28.

Cabinet 35 contains the electronic circuitry used in processing the strain gage signals gathered via cable 34 from the strain gaged beams 36.

FIG. 2 shows the positioning of turboshaft engine 22 within the torque correlation ring assembly. Engine casing 40 is secured to second ring 24 of the torque correlation ring assembly by means of mounting jig 26. Mounting jig 26 attaches to a multiplicity of lands 42 on the engine casing 40. Lands 42 are among the points used for mounting the engine to an aircraft pylon. By attaching engine 22 to the torque correlation ring assembly in this manner, power output shaft 44 extends axially outward in one direction and the exhaust from turbine section 46 is propelled along the other axis.

Figure 3:
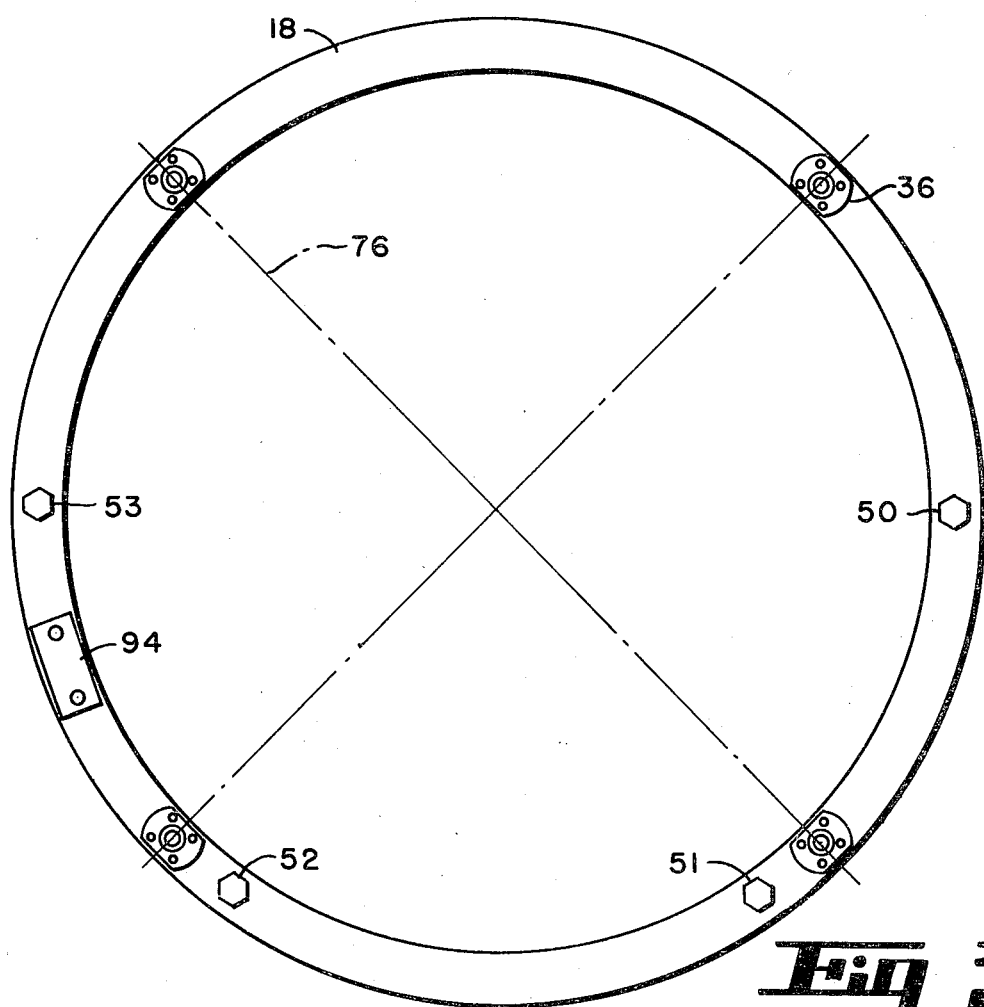
FIG. 3 is an end view taken along line 3—3 of FIG. 2 showing the annular ring which is secured to the frame of the test stand.

FIG. 3 shows an end view of ring 18 taken along line 3—3 of FIG. 2. It will be understood by reference to FIG. 1 that ring 18 is secured to frame 20 by means of bolts 50, 51, 52 and 53. Four strain gaged beams 36 are positioned at equally spaced intervals around the side of ring 18. If the center of bolt 50 (See FIG. 3) is assumed to be the zero degree location on ring 18, then the four strain gaged beams 36 are positioned at the 45, 135, 225 and 315 degree points. Further, the centerline 76 of each strain gaged beam 36 is oriented so as to coincide with a radial extending outward from the center axis of ring 18. This orientation of each strain gaged beam results in an arrangement wherein the centerlines of all are at an angle of 45 degrees with respect to the horizontal.

The configuration of a strain gaged beam 36 is shown more fully in FIGS. 4, 5 and 6. FIG. 4 shows a view of the flange end 54 of one of the strain gaged beams 36. Flange end 54 allows the strain gaged beam 36 to be secured to second ring 24 by means of bolts attached through holes 55, 56, 57, and 58. A side view of the central beam portion of strain gaged beam 36 is shown in FIG. 5. In the unit reduced to practice the strain gaged beam except for the strain gages was milled from a single block of steel. The important point to note is that when testing an aircraft engine having a rated output in the 1000 Hp range, there are considerable forces being experienced at each of the four strain gaged beams 36. This means that each strain gaged beam has to be strong. Strength is achieved by using a large radius of curvature on fillets 62 and 64 plus keeping sharp corners to a minimum change in direction. A flat land 66 is milled on both sides along the center section of each strain gaged beam (See dashed lines in FIG. 4). Additional milling from two directions forms the flat land platform 60.

FIG. 6 shows an enlarged top view of one of the flat land platform 60 areas. A twin strain gage 90 degree rosette 70 is attached as by cementing to the face of the flat land platform 60 area. The strain gage (70–72) is positioned as shown in FIG. 6. Three leads 73, 74 and 75 are brought out from the two strain gages with 75 being a common line connected between one end of each strain gage. Positioned in this manner, one gage is in compression whilst the other is in tension for "torque forces" so that for the four strain gaged beams interconnected torque forces are additive and axial thrust, vertical and overhung forces cancel one another. It will be recalled that the centerline 76 of each strain gaged beam 36 coincides with a radial extending outward from the center axis of ring 18. This causes torque forces due to reaction between the propeller and the engine casing to stress each strain gaged beam 36 at right angles to centerline 76.

The strain gages forming a part of the four strain gaged beams shown in FIG. 3 are encircuited as shown in FIG. 7. The eight strain gages, two per each strain gaged beam, are arranged in the form of a bridge. The three leads 73, 74 and 75 from the FIG. 6 beam are connected as shown in FIG. 7 such that lead 73 is joined to lead 86 of the adjacent strain gaged beam. Similarly, lead 74 is joined with lead 77, lead 78 is joined to lead 81, and lead 82 connects to lead 85. It will be understood that connecting leads 89, 90, 91 and 92, in combination with leads 75, 79, 83 and 87, constitute a multiplicity of cables which transfer the signals from the four strain gaged beams to a junction box 94.

Junction box 94 is attached to annular ring 18 as shown in FIG. 3. Junction box 94 serves both as the distribution point for the cables and as the receptacle for temperature compensating resistors 96, 97, 98 and 99 (See FIG. 7). The use of compensating resistors 96–99 helps to maintain system calibration throughout the operating temperature extremes experienced.

The output from the Wheatstone-bridge arrangement of the four parts of strain gages is conveyed by four-wire shielded cable 34 to signal processor circuitry contained in cabinet 35 (See FIG. 1). Signal processing circuitry in cabinet 35 is conventional and not considered to be a part of this invention.

Figure 8:
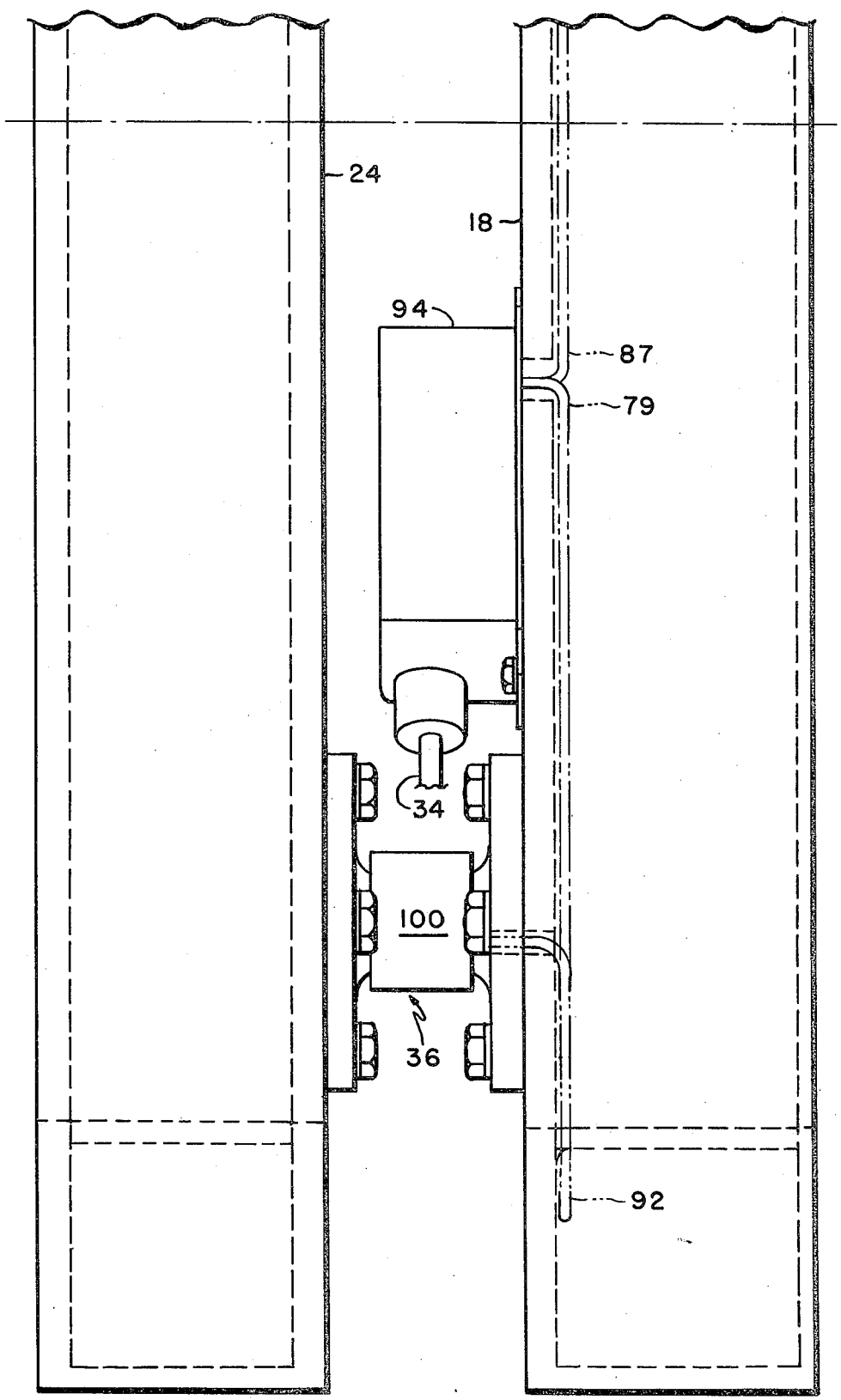
FIG. 8 is an enlarged view of a portion of the torque correlation ring.

FIG. 8 shows an enlarged view of a portion of the torque correlation ring. On the right is first ring 18 which is shown to be made as a hollow box type structure. This is accomplished by welding end plates on inner and outer hoop sections. Bolted to the side of first ring 18 are strain gaged beams 36 and junction box 94. Cables 79, 87 and 92 which connect strain gaged beams 36 to each other and to junction box 94 are placed within the hollow interior of first ring 18. Second ring 24, constructed in the same manner as first ring 18, attaches by bolts to the second end of strain gaged beams 36. As shown in FIG. 8, strain gaged beam 36 has a protective cover 100 over the strain gages attached to its midsection. It will be understood that the torque correlation ring of FIG. 8 has provisions for additionally attaching first ring 18 to test frame member 20 and second ring 24 to engine 22 via mounting jig 26.

The theoretical analysis of the strain gaged beam, designed for the Torque Correlation Ring, involves two principle methods.

First, the beam stress at the strain gaged surface must be analyzed using a finite element stress computer program. This is because of the relatively short beam compared to other dimensions.

Secondly, the application of stress from different sources simultaneously requires analysis using the technique known as Mohr's Circle. (See Mechanical Engineers' Handbook, Edited by Theodore Baumeister, Sixth Edition, 1958, McGraw-Hill Book Co., Inc. p. 3-20). This shows that complete cancellation of, for instance, an axial thrust force will not occur, and that as far as this thrust is a variable, related to torque for different fan absorption devices, a constant for correction must be applied where accuracy greater than ±1% is required. For any particular fan, the relation is proportional and is corrected for in the electronic signal conditioning equipment by well known techniques. Additionally, it is to be noted that each of the strain gaged beams is mounted on annular ring 18 such that its flat land 66 is oriented at 45 degrees with respect to the horizontal. This orientation (See FIG. 3) allows the Wheatstone-bridge circuit of FIG. 7 to balance out the gravity forces. More broadly, any symmetrical orientation of the strain gaged beams will allow the non-torque forces to be balanced out. By symmetry is meant that the beams are arranged in pairs with one of each pair being aligned at right angles to its companion.

It will be understood that the invention is not limited to the specific embodiment disclosed in the drawings. Various modifications can be made with regard to the annular ring and load cell structures without limiting the scope of the invention which is set forth in the following claims.

We claim:

1. A torque correlation ring assembly for an engine test stand having frame members extending therefrom, said test stand being useful in measuring performance of an aircraft turboshaft engine having both an output shaft and a casing with mounting points for fixedly suspending said engine, the output shaft being fitted with a propeller of known characteristics, the torque correlation ring assembly comprising:

a first vertically oriented annular ring fixedly attached along one edge to the frame members of said test stand;

a plurality of equally spaced strain gaged beams each fixedly attached at one of its ends to that edge of said first annular ring which is opposite the edge attached to said frame members, each of said strain gaged beams having a central beam section, the centerlines of said central beam sections being oriented so as to coincide with radials extending from the center of said annular ring;

a second vertically oriented annular ring fixedly attached along one edge to the second ends of said strain gaged beams;

a mounting jig attached at its periphery to the second edge of said second annular ring, the inner edge of said mounting jig being configured for attachment to the mounting points on the casing of said aircraft engine, said aircraft engine being mounted coaxially within said annular rings so that its output shaft extends axially along the centerline of said first and second annular rings;

strain gages attached to each of said central beam sections, the plurality of said strain gages being wired together to produce an electrically combined signal capable of being processed to provide an accurate measurement of the torque applied to said torque correlation ring assembly.

2. The torque correlation ring assembly of claim 1 wherein four strain gaged beams are fixedly attached between the first and second annular rings, the spacing between strain gaged beams being at equal intervals, the transverse centerline of the central beam section of each of said strain gaged beams being positioned such that said transverse centerline coincides with a radial extending outward from the central axis of said first annular ring and making thereby a centerline orientation for each of said four strain gaged beams which is at 45 degrees with respect to the horizontal.

3. The invention as described in claim 2 wherein the strain gages attached to each of said central beam sections are interconnected to form a Wheatstone-bridge circuit.

4. The invention as described in claim 3 and including temperature compensating resistors in the source arms of the Wheatstone-bridge circuit.

5. The torque correlation ring assembly of claim 1 wherein two strain gage grids are attached to each central beam, the orientation of said grids being such that the longitudinal axis of one is perpendicular to the longitudinal axis of the other, the plane in which each strain gage grid lies being perpendicular to a radial drawn outward through the strain gaged beam section from the center of the annular ring.

6. The invention as described in claim 5 wherein four equispaced strain gaged beams are fixedly attached between the first and second annular rings, the central beam section of each of said strain gaged beams including two parallel walled flat land areas and a central flat land platform section, the three being joined together to form thereby an H-shaped cross section, the area on top of the central flat land platform section being used for attaching strain gages thereon.

7. The invention as described in claim 6 wherein the strain gages from the four strain gaged beams are encircuited by connecting leads to form a Wheatstone-bridge, the signal output from said bridge circuit being proportional to torque applied to said torque correlation ring assembly.

8. The torque correlation ring assembly of claim 1 wherein both first and second annular rings are of a hollow box type structure, each consisting of inner and outer hoop sections positionally secured between a pair of annular shaped disks.

9. The torque correlation assembly of claim 1 wherein the central beam section of each of said strain gaged beams is milled from a solid block of steel.

* * * * *